(12) United States Patent
Bauer et al.

(10) Patent No.: US 8,151,077 B1
(45) Date of Patent: Apr. 3, 2012

(54) APPLICATION AWARE CACHE MANAGEMENT

(75) Inventors: Andreas L. Bauer, Boxborough, MA (US); Stephen J. Todd, Shrewsbury, MA (US); Mark A. Parenti, Milford, NH (US); Brian A. Castelli, Fuquay Varina, NC (US)

(73) Assignee: EMC Corporation, Hopkinton, MA (US)

( * ) Notice: Subject to any disclaimer, the term of this patent is extended or adjusted under 35 U.S.C. 154(b) by 947 days.

(21) Appl. No.: 12/164,336

(22) Filed: Jun. 30, 2008

(51) Int. Cl.
*G06F 12/00* (2006.01)
(52) U.S. Cl. ........................................ 711/170; 711/118
(58) Field of Classification Search .................. None
See application file for complete search history.

(56) References Cited

U.S. PATENT DOCUMENTS

| | | | |
|---|---|---|---|
| 7,401,358 B1* | 7/2008 | Christie et al. | 726/21 |
| 7,793,049 B2* | 9/2010 | Cain et al. | 711/133 |
| 7,949,834 B2* | 5/2011 | Morrow | 711/144 |
| 7,984,245 B2* | 7/2011 | Takada et al. | 711/141 |
| 2008/0177952 A1* | 7/2008 | Morrow | 711/133 |

* cited by examiner

*Primary Examiner* — John Lane
(74) *Attorney, Agent, or Firm* — Krishnendu Gupta; Jason A. Reyes; Deepika Bhayana

(57) ABSTRACT

A method is used in application aware cache management. A cache management policy is received including one or more sets of device generic application best practices and one or more sets of device specific best practices. Initial cache configuration processing is performed in connection with configuring a cache of a data storage system. The cache management policy is used in performing the initial cache configuration processing. Storage objects are identified as being in use by an application. Ongoing cache configuration processing is performed in connection with configuring the cache of the data storage system for use with the storage objects.

20 Claims, 9 Drawing Sheets

```
spA->setWriteCacheSize(9000 MB)
spA->setReadCacheSize(1000 MB)
spB->setWriteCacheSize(9000 MB)
spB->setReadCacheSize(1000 MB)
for (lun in ExchangeLUNSet)
{
    lun->setWriteCache(on, pagesize = 64kb,
    mirroredCache)
}
```

FIG. 9

APPLICATION AWARE CACHE MANAGEMENT

BACKGROUND

1. Technical Field

This application relates to application aware cache management.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives (referred to as "disks" or "drives"), and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Typically, a memory in a modern digital data processing system such as a data storage system consists of a hierarchy of storage elements, extending from large-capacity but relatively slow storage elements and various levels of lower-capacity and relatively fast storage devices. The large-capacity and relatively slow devices include such types of devices as disk or tape storage devices which store information on a magnetic medium; such devices are relatively inexpensive on a storage cost per unit of storage basis. Intermediate in the hierarchy, both in terms of speed and storage capacity are random-access memories, which are somewhat faster than the disk or tape devices, but which are also more expensive on a storage cost per unit of storage basis. At the fastest end of the hierarchy are cache memories, which are also the most expensive and thus generally the smallest.

Generally, during processing operations, a processor will enable information to be processed to be copied from the slower devices to the increasingly faster devices for faster retrieval. Generally, transfers between, for example, disk devices and random-access memories are in relatively large blocks, and transfers between the random-access memories and cache memories are in somewhat smaller "cache lines." In both cases, information is copied to the random-access memory and cache memory on an "as needed" basis, that is, when the processor determines that it needs particular information in its processing, it will enable blocks or cache lines which contain information to be copied to the respective next faster information storage level in the memory hierarchy. Certain prediction methodologies have been developed to attempt to predict the whether a processor will need information for processing before it (that is, the processor) actually needs the information, and to enable the information to be copied to the respective next faster information storage level. However, generally at some point in the processing operations, the processor will determine that information required for processing is not available in the faster information storage level, that is, a "read miss" will occur, and it (that is, the processor) will need to delay its processing operations until the information is available. Generally, the rate at which read misses will occur with storage element(s) at a particular level in the hierarchy will be related to the storage capacity of the storage element(s) at the particular level, as well as the pattern with which the processor accesses the information in the respective storage level. In any case, to enhance the processing efficiency of a digital data processing system, it is generally helpful to be able to assess the effect of changing the capacity of the memory element(s) at a particular level in the memory hierarchy on the rate of read misses at the particular level. (Similarly, with respect to a write cache, if a write cache is full of data that has not yet been destaged to slower storage elements, a write pends until a portion of the cache is flushed. In another case, write-through may be used when the cache is full. In either case, a similar delay to that experienced for the read miss is endured.)

Caching controllers that interface with host computers or the like for directing data exchanges with data storage systems such as large arrays of magnetic data storing disks, or other storage media, have been developed for providing a storage medium for large quantities of digital information. These controllers respond to read and write commands from a remote computer system to receive, and/or deliver data over interconnecting busses. They often employ expensive solid state storage, such as RAM, to cache host data to minimize the relatively long latency of the disk subsystem.

The caching controller functions so that it minimizes delays and demands on the host system, while including the ability to recover wherever possible from errors from single points of failure. System configurations and operations capable of dynamically overcoming single points of failure are sometimes referred to as fault tolerant systems. Such redundant fault tolerant systems and operations in a disk array controller environment are described in commonly-assigned U.S. patent application Ser. No. 08/561,337, filed Nov. 21, 1995 entitled "Improved Fault Tolerant Controller System and Method" by W. A. Brant, M. E. Nielson an G. Howard; Ser. No. 08/363,132 entitled "A Fault Tolerant Memory System" by G. Neben, W. A. Brant and M. E. Nielson; and Ser. No. 08/363,655 entitled "Method and Apparatus for Fault Tolerant Fast Writes Through Buffer Dumping" by W. A. Brant, G. Neben, M. E. Nielson and D. C. Stallmo (a continuation-in-part application of U.S. Ser. No. 08/112,791 by Brant and Stallmo which is itself a continuation-in-part of application Ser. No. 638,167 filed Jan. 6, 1991 by Brant, Stallmo, Walker and Lui the latter of which is now U.S. Pat. No. 5,274,799).

The cache controller avoids wait time by the host computer, or central processor, in reading or writing relative to a disk by buffering write data into a protected fast memory, and servicing most read data from fast memory. A system, as described in the above-referenced patent applications, can include redundant storage media array controllers for responding to host computer requests for transferring data between that host computer and an arrangement for low cost but large quantity data storage.

In "Computer Architecture, A Quantitative Approach" by D. A. Patterson and J. L. Hennessey (Morgan Kaufmann Publishers, Inc., Second Edition, 1990, 1996), discusses processor memory, or RAM, and how it is cached. It describes the disciplines, such as direct map, set associative, and the like.

Different tasks may be performed in connection with a data storage system. For example, a customer may perform data storage configuration and provisioning tasks. Such tasks may include, for example, configuring and provisioning storage for use with an email application. Tasks may include allocating cache and storage, specifying the logical and/or physical devices used for the storage allocation, specifying whether the data should be replicated, the particular RAID (Redundant Array of Independent or Inexpensive Disks) level, and the like. With such options in connection with performing configuration and provisioning tasks, a customer may not have the appropriate level of sophistication and knowledge needed.

Thus, it may be desirable to utilize a flexible technique which assists customers in connection with performing data storage management tasks such as related to data storage configuration and provisioning. It may be desirable that the technique be adaptable to the particular knowledge level of the user to provide for varying degrees of automation of data storage configuration and provisioning in accordance with best practices that may vary with the underlying data storage system and application.

SUMMARY OF THE INVENTION

A method is used in application aware cache management. A cache management policy is received including one or more sets of device generic application best practices and one or more sets of device specific best practices. Initial cache configuration processing is performed in connection with configuring a cache of a data storage system. The cache management policy is used in performing the initial cache configuration processing. Storage objects are identified as being in use by an application. Ongoing cache configuration processing is performed in connection with configuring the cache of the data storage system for use with the storage objects.

BRIEF DESCRIPTION OF THE DRAWINGS

Features and advantages of the present invention will become more apparent from the following detailed description of exemplary embodiments thereof taken in conjunction with the accompanying drawings in which:

FIG. 9 is an example representing information that may be included in a script or policy in an embodiment using the techniques herein.

DETAILED DESCRIPTION OF EMBODIMENT(S)

Figure 1:
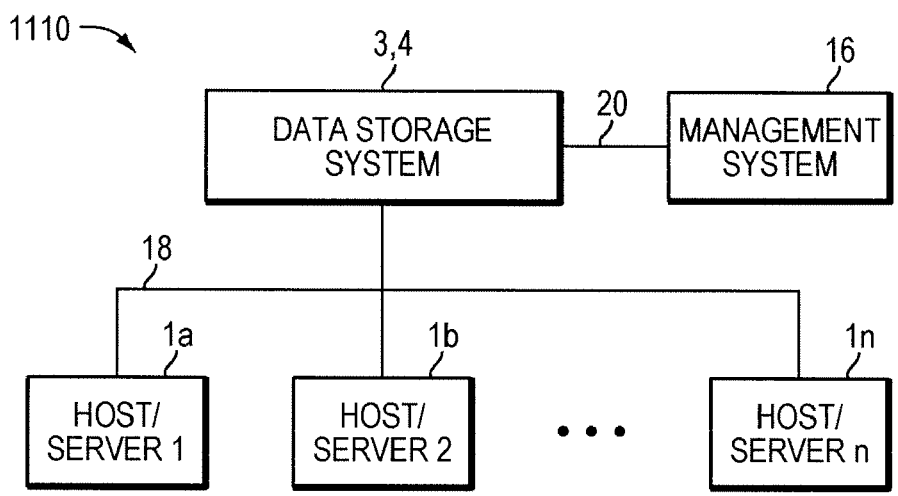
FIGS. 1-2 depict an example of an embodiment of a system that may utilize the techniques described herein.

Referring to FIG. 1, shown is an example of an embodiment of a computer system that may be used in connection with performing the techniques described herein. The computer system 1110 includes one or more data storage systems 3, 4 connected to server or host systems 1a-1n through communication medium (also called link or bus) 18. The system 1110 also includes a management system 16 connected to one or more data storage systems 3, 4 through communication medium 20. In this embodiment of the computer system 1110, the management system 16, and the N servers or hosts 1a-1n may access the data storage systems 3, 4, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 1a-1n may access and communicate with the data storage systems 3, 4, and may also communicate with other components (not shown) that may be included in the computer system 1110. In one embodiment, the communication medium 20 may be a LAN connection and the communication medium 18 may be an iSCSI or fibre channel connection.

Each of the host systems 1a-1n and the data storage systems 3, 4, included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 1a-1n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 3, 4, are described herein in more detail, and may vary with each particular embodiment. Each of the host computers 1a-1n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 1a-1n may issue a data request to the data storage systems 3, 4, to perform a data operation. For example, an application executing on one of the host computers 1a-1n may perform a read or write operation resulting in one or more data requests to the data storage systems 3, 4.

The management system 16 may be used in connection with management of the data storage systems 3, 4. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 3, 4, of FIG. 1 may be an appliance with hardware and software for hosting the data storage of the one or more applications executing on the hosts 1a-1n. The appliance may include one or more storage processors and one or more devices upon which data is stored. The appliance may include software used in connection with storing the data of the hosts on the appliance and also software used in connection with configuring and provisioning the data storage for use by the hosts in connection with techniques described herein. As an example in connection with an email application server component that may executed on the hosts 1a-1n, the data storage configuration and provisioning tasks may include allocating storage for user accounts or mailboxes, specifying the devices (logical and/or physical) used to store the email data, specifying whether data replication is performed for disaster recovery, configuring the physical devices in one or more RAID groups and other logical entities, and the like. Techniques that may be used in connection with performing data storage configuration, and configuration and provisioning tasks are described in more detail in following paragraphs in order to provide ease of use to customers of the data storage system(s) 3, 4.

In connection with an embodiment in which the data storage 3, 4, is an appliance including hardware and software, the appliance may also include other software for performing different data services. For example, the appliance may include backup server software which interacts with software on the hosts 1a-1n when performing a backup operation.

In another embodiment, the data storage systems 3, 4, may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 3, 4, may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 3, 4. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Figure 2:
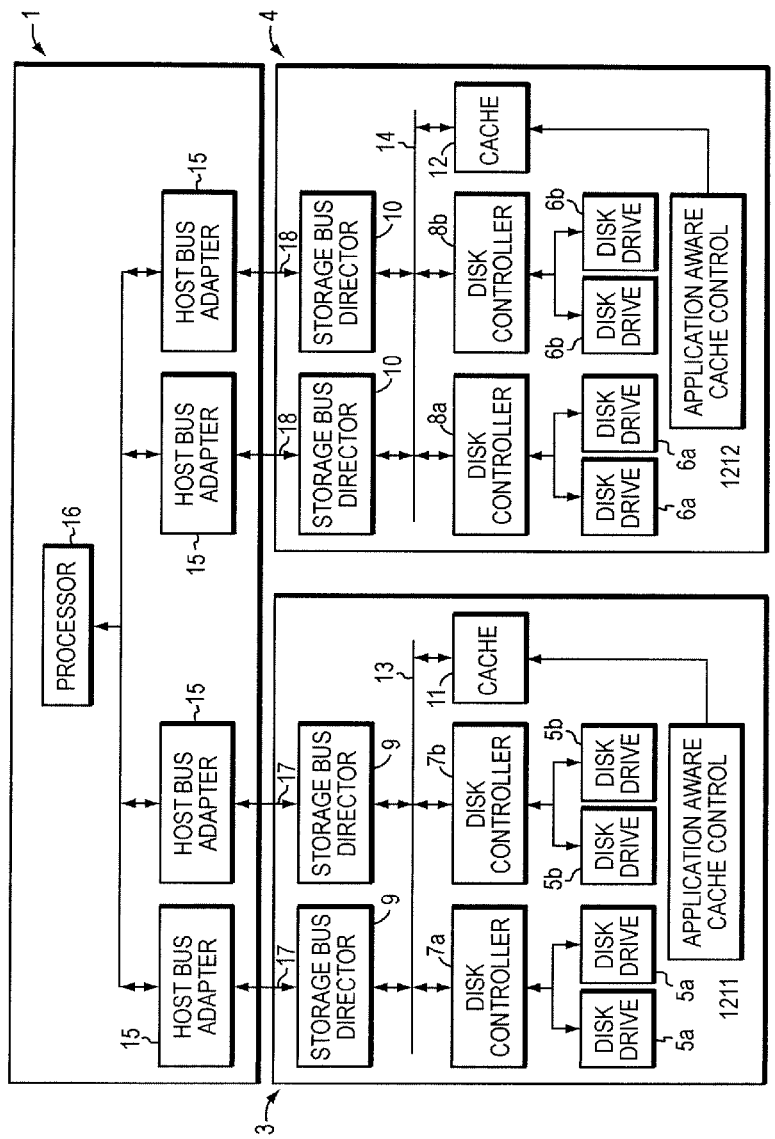

In a specific embodiment illustrated in FIG. 2 and referenced below, the storage systems 3, 4 include a plurality of disk drives (5a-5b or 6a-6b) and a plurality of disk controllers (7a-7b or 8a-8b) that respectively control access to the disk drives. A plurality of storage bus directors (9, 10) control communication with host computer 1 over communication buses (17, 18). Each storage system 3, 4 further includes a cache 11, 12 to provide improved storage system performance. In particular, when the host computer 1 executes a read from one of the storage systems 3, 4, the storage system may service the read from its cache 11, 12 (when the data is stored in the cache) rather than from one of the disk drives 5a-5b or 6a-6b to execute the read more efficiently. Similarly, when the host computer 1 executes a write to one of the storage systems 3, 4, corresponding storage bus directors 9, 10 can execute the write to the cache 11, 12. Thereafter, the data can be de-staged asynchronously in a manner transparent to the host computer 1 to the appropriate one of the disk drives 5a-5b, 6a-6b. Finally, storage systems 3, 4 include internal buses 13, 14 over which storage bus directors 9, 10, disk controllers 7a-7b, 8a-8b and caches 11, 12 communicate.

The host computer 1 includes a processor 16 and one or more host bus adapters 15 that each controls communication between the processor 16 and one of the storage systems 3, 4 via a corresponding one of the communication buses 17, 18. It should be appreciated that rather than a single processor 16, host computer 1 can include multiple processors. Each bus 17, 18 can be any of a number of different types of communication links, with the host bus adapter 15 and storage bus directors 9, 10 being adapted to communicate using an appropriate protocol for the communication buses 17, 18 coupled therebetween. For example, each of the communication buses 17, 18 can be implemented as a SCSI bus with the directors 9, 10 and adapters 15 each being a SCSI driver. Alternatively, communication between the host computer 1 and the storage systems 3, 4 can be performed over a Fibre Channel fabric.

Typically, the storage systems 3,4 make storage resources available to the host computer for assignment to entities therein, such as a file system, database manager or logical volume manager. If the storage systems are so-called "dumb" storage devices, the storage resources made available to the host computer will correspond in a one-two-one relationship to physical storage devices within the storage systems. However, when the storage systems are intelligent storage systems, they will present logical volumes of storage to the host computer that need not necessarily correspond in a one-to-one relationship to any physical storage devices within the storage system, as the intelligent storage systems may map each logical volume of storage presented to the host across one or more physical storage devices.

In an embodiment in which element 3, 4, of FIG. 1 is implemented using one or more data storage systems, each of the data storage systems may include code thereon for performing the techniques as described herein. In particular, as described in more detail below, the caches 11, 12 are controlled by application aware cache control logic 1211, 1212 respectively, in accordance with one or more cache configuration techniques described herein.

In general, servers or host systems, such as 1*a*-1*n*, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes. Data storage devices may also be configured using other logical device layers on top of the LV or LUN which are then exposed to the host or other component using the configured data storage.

In following paragraphs, reference may be made to a particular embodiment such as, for example, an embodiment in which element 3, 4 of FIG. 1 is an appliance as described above. However, it will be appreciated by those skilled in the art that this is for purposes of illustration and should not be construed as a limitation of the techniques herein.

Described in following paragraphs are techniques that may be used to assist customers of a data storage system in connection with performing data storage system management tasks such as related to data storage system configuration, cache provisioning, and the like. The techniques herein are adaptable to the particular knowledge level of the user. The techniques are flexible and allow for implementation of best practices and defaults in an automated fashion which are customized for the particular application, user or customer, and/or underlying data storage system and environment to meet specific customer needs. As will be described in more detail, depending on the level at which a user interacts with the data storage system, different levels or amounts of automation of the best practices may be performed. Depending on how the data storage system is configured, the user may elect to bypass the automation of best practices or limit the amount of automation performed by interacting with the system at various levels. User proficiency levels and exemplary embodiments are described in more detail in U.S. patent application Ser. No. 11/824,578, filed Jun. 29, 2007, APPLICATION AWARE STORAGE, which is incorporated by reference herein.

What will be described herein are techniques that may be used in connection with performing data storage configuration and provisioning of cache in connection with a request, for example, to prepare data storage for use with an application hosting data on a data storage system.

Figure 3:
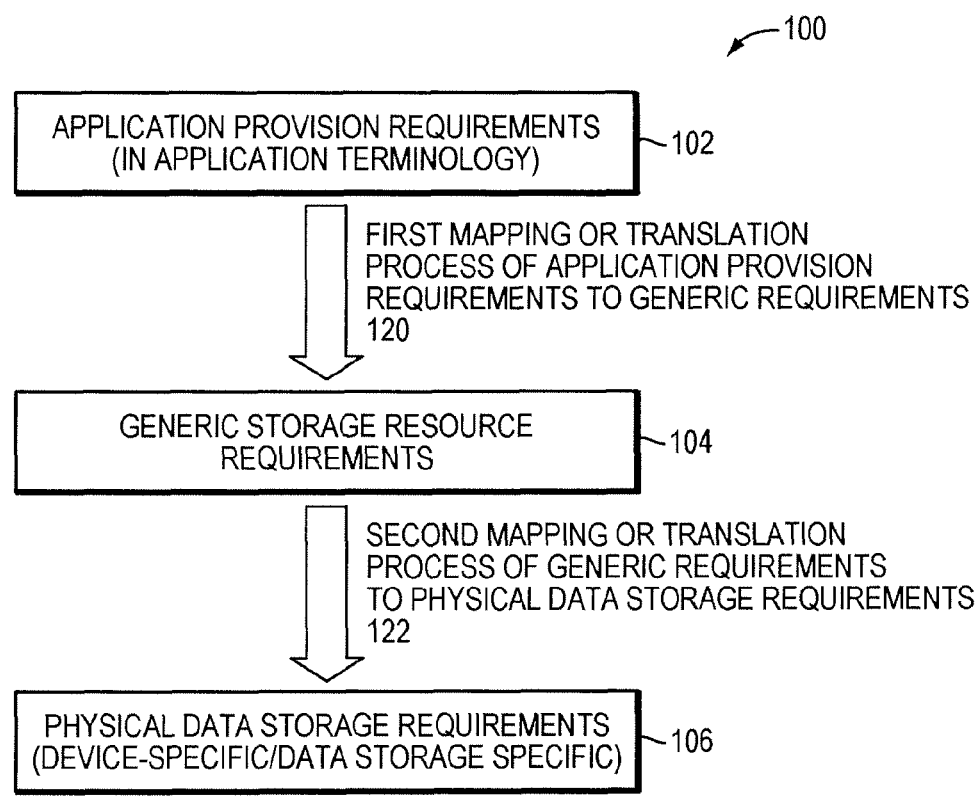
FIG. 3 is an example representation of the mapping or translation processes that may be performed in an embodiment in accordance with the techniques herein.

Referring to FIG. 3, shown is an example representation of the processing that may be performed in an embodiment in accordance with the techniques herein. The example 100 illustrates the processing that may be performed in connection with a request to provision storage of a data storage system for use by an application. For example, a provisioning request may be made to allocate storage for a number of mailboxes for use by an email application. The example 100 includes application provision requirements 102 which may be mapped or translated into generic storage resource requirements 104, such as generic cache provisioning requirements, in a first mapping or translation stage 120. The generic storage resource requirements 104 may be mapped or translated into physical storage requirements 106, such as device specific cache provisioning requirements, in a second mapping or translation stage 122. The mapping stage 120 may be performed in accordance with application best practices. The steps comprising stage 120 may vary with each application. The mapping stage 122 may be performed in accordance with data storage specific best practices. The steps comprising stage 122 may vary with the particular underlying data storage system.

The application best practices implemented as part of 120 in an embodiment may be determined based on experience, know how, testing and the like, in connection with provisioning storage for a particular application. The data storage specific best practices implemented as part of 122 in an embodiment may be based on experience, know-how, testing, and the like, in connection with provisioning and configuring storage for a particular data storage system. To illustrate, the mapping performed in the first stage 120 may vary with a particular email application, database application, and the like. A different set of processing steps may be performed for each of the foregoing applications in accordance with the application best practices of each application. The mapping performed in the second stage 122 may vary with each data storage system provided by a same vendor or different vendor. For example, EMC Corporation provides the Symmetrix® data storage system and the CLARiiON® data storage system. A different set of processing steps may be performed for each of the foregoing data storage systems in accordance with data storage system specific best practices in connection with the second stage 122. Both the application best practices and data storage system specific best practices may be codified in accordance with techniques herein to provide for automatically provisioning data storage system resources. An embodiment utilizing the techniques herein may implement the application and data storage system best practices using executable code which is executed on the data storage system when processing a request to provision storage and/or configure storage for use with the techniques herein. As will be described in more detail herein, the best practices may be codified using any one of a variety of different techniques known in the art such as, for example, using a script language, rules, programming language, and the like. Although reference may be made to particular ways in which the techniques herein may be implemented for purposes of example and illustration, such reference should not be construed as a limitation of the techniques herein.

Each of the different requirements 102, 104 and 106 and the two mapping stages 120 and 122 will now be described in more detail.

The application provision requirements 102 may specify the one or more provisioning requirements for a request. The requirements may make reference to application-specific terminology. The application provision requirements 102 may be the user inputs for the provisioning request received via a user interface (UI) using any one of a variety of different supported interfaces and techniques. The application provision requirements 102 may vary with user level and/or particular application for which the provisioning request is issued.

In one embodiment, the UI may provide for one or more different types of user interfaces and associated data. For example, the UI may provide support for a graphical user interface (GUI), command line interface (CLI), and the like. As also described herein, one or more different user levels may be provided in accordance with different levels of user proficiency. A user may interact with a system utilizing the techniques herein at any one of the user proficiency levels. The application provision requirements 102 may vary with each of the different user proficiency levels of interaction that may be provided in an embodiment. Each of the different user levels may provide a different logical view and level of abstraction with respect to a data storage task to be performed for an application executing on one of the hosts. Each of the different user levels may provide a different level of detail with respect to the underlying operations and tasks performed on the data storage system in accordance with different levels of user sophistication and knowledge. The language or terminology of the UI and application provision requirements 102, UI data (e.g., content or data used to populate the UI menus), and UI presentation or structure (e.g., commands presented or particular hierarchical menu structure) may vary in accordance with the particular user level at which a user interacts with the data storage system as well as the application for which the provisioning request is being performed. Thus, a user may interact with the data storage system at a variety of different levels when issuing data storage configuration requests for the same application. The UI and application provision requirements may be customized for the particular level and application for which the request is performed.

In an embodiment, the application provision requirements 102 may be characterized as a set of application-specific requirements that may vary depending on the target user and associated user level at which the user may interact with the system. Thus, the application provision requirements 102 obtained in connection with a UI may vary with the user level and application. As described in more detail in following paragraphs, each user level may provide a different user interface and set of application provision requirements 102 for a different level of user interaction and level of knowledge and sophistication. Each user level may also be associated with a different level of automation of the application best practices, for example, with users interacting at a NOVICE level obtaining the greatest amount of automation of application best practices with an appropriate level of abstraction, and users interacting at other levels, such as INTERMEDIATE and EXPERT, obtaining a different appropriate level of abstraction and automation with respect to application best practices.

For example, a NOVICE user level may provide a beginner or most simplistic view of the data storage system and tasks performed for data storage configuration and provisioning in accordance with application best practices. NOVICE user level interactions require the least amount of knowledge and may be geared toward interacting with users having minimal knowledge when performing a data storage configuration or provisioning request by providing the greatest level of abstraction of the underlying system and operations performed. The language may be more non-technical in comparison to the interface language of other levels. As the user level increases (e.g., to INTERMEDIATE or EXPERT), so does the assumed level of knowledge of the user in connection with interactions. An EXPERT user level may be utilized by the most knowledgeable users providing a greatest granularity of control of all user levels in connection with a data provisioning request. The EXPERT user level may expose more detailed information to the user than interactions at NOVICE and INTERMEDIATE levels. As an example, a NOVICE level user may issue a request to provision storage for a number of mailboxes for storing data of an email application executing on one of the hosts. The NOVICE user may specify a minimal amount of information in connection with the request such as a number of mailboxes. A user may interface with the data storage system using a GUI and issue the data storage provision request. The language and terminology of user interactions via the GUI may be customized for the NOVICE user level of the email application. In connection with the same email application, a more knowledgeable user may choose to issue a data storage provision request via a GUI for a same number of mailboxes by interacting with the data storage system at an INTERMEDIATE or EXPERT level. For example, an EXPERT user level may provide a more detailed information about the request regarding the underlying data storage device and how this data storage device is used by the application. To further illustrate, the EXPERT level data storage provision request may specify additional application-specific information, cache configuration information, the physical and/or logical devices upon which storage is allocated, provide vendor-specific or data storage-specific attributes or settings, indicate a number and type of files or data storage volumes created, and the like, that may vary with application for which storage is being provisioned. In connection with the type of file or volume for which storage is allocated, this may be particular to the email application. A file may be a database or a log file. The log files are used to keep a record of transactions taking place and may be used in connection with recovery operations. The database files hold mailbox stores such as email data. In connection with the NOVICE user level, the user may simply input a number of mailboxes and may omit additional detail such as specification of a number and size of database storage volumes, log volumes, and the like, as may be specified with an EXPERT level. For the NOVICE user level, such details may be specified as part of the mapping process 120 which maps the application provision requirements 102, that may vary with user level, to generic storage requirements 104. The defaults and other details in connection with the first mapping or translation stage 120 may be customized for the particular application in accordance with application best practices.

The application provision requirements 102 may be mapped in the first mapping or translation stage 120 to generic resource requirements in accordance with application best practices. Additionally, the first mapping or translation stage 120 may generate other output, such as application-specific information including application-specific attributes. The application-specific information may not be used in connection with the specifying generic storage resource requirements or otherwise involved in the second mapping or translation process. The application-specific information, and possible uses thereof, are described in more detail below. The application best practices may be a codified instance of 120 for each application. The generic storage resource requirements 104 may be characterized as an expression of the provisioning request in terms of application-neutral or application independent data elements and application independent data element properties. The generic storage requirements 104 refer to data elements that may be used as a common way of expressing the storage requirements for many different applications. In contrast, the application provision requirements 102 may make reference to data elements which are application-specific such as a number of mailboxes. The application-specific requirements of 102, such as number of mailboxes, may be translated by 120 into application independent data elements that may be used as an intermediate expression of storage requirements for a provisioning request. As will be described in more detail in following paragraphs, generic storage requirements may refer to generic cache provisioning requirements or generic storage pools of storage volumes configured for use with servicing different application provisioning requests.

For example, a storage pool of FAST storage may be defined. FAST storage may be defined as a general category of "fast" storage based on one or more different data storage system-specific properties which are used to characterize the storage pool and are used as part of the second mapping stage 122. Such data storage specific properties may not be expressly or specifically included in the generic storage resource requirements 104. Rather, the generic requirements of 104 may reference an abstract data storage element property of FAST based on one or more underlying data storage specific attributes. The particular properties and associated values used to define a FAST storage pool as well as other storage pools may vary with the underlying data storage system and associated data storage system best practices. A portion of storage from one of the storage pools, such as a volume or portion thereof, may be used in specifying generic data storage resource requirements 104. As another example, an embodiment may define one or more CHEAP storage pools along with one or more FAST storage pools for use in connection with specifying generic resource requirements 104. As with FAST storage pools, CHEAP may be an abstract data storage element property based on one or more data storage specific properties and values that vary with the underlying data storage system. The particular properties and values used to characterize and define a CHEAP storage pool may vary with data storage system and associated data storage system best practices. CHEAP may refer to a second type of data storage which may be characterized as inexpensive and not as fast in connection with servicing I/O requests relative to the storage pools of type FAST. In contrast to CHEAP storage pools, storage pools of type FAST may consist of faster device types and device configurations which may typically result in faster I/O request service times. Other embodiments may use a different number and different types or categories of storage pools other than FAST and CHEAP. In one embodiment as described herein, the generic storage resource requirements may be expressed in terms of generic data storage elements, such as storage pools and portions thereof, having one generic data storage element properties, such as FAST or CHEAP.

In another example, a write-weighted cache configuration may be defined. Write-weighted cache configuration storage may be defined as a general category of cache configuration based on one or more different data storage system-specific properties which are used to characterize cache provisioning and are used as part of the second mapping stage 122. The generic requirements of 104 may reference an abstract data storage element property of write-weighted based on one or more underlying data storage specific attributes. The particular properties and associated values used to define a write-weighted cache configuration may vary with the underlying data storage system and associated data storage system best practices. As another example, an embodiment may define a read-weighted cache configuration in connection with specifying generic resource requirements 104. As with write-weighted, read-weighted may be an abstract data storage element property based on one or more data storage specific properties and values that vary with the underlying data storage system. The particular properties and values used to characterize and define a read-weighted cache configuration may vary with data storage system and associated data storage system best practices. Read-weighted may refer to a cache provisioning strategy which may be characterized as intended to give priority to aiding the performance of servicing read I/O requests. In contrast to read-weighted cache configuration, write-weighted cache configuration may be characterized as intended to give priority to aiding the performance or reliability of servicing write I/O requests.

As described above, the first mapping or translation stage 120 may output generic storage resource requirements and also application-specific information or application specific attributes. The application-specific information may be characterized as additional attributes associated with the generic storage resource requirements but which are not used in connection with the second mapping stage 122. The generic storage resource requirements are mapped in the second mapping stage 122, but the application-specific information is not utilized. The application-specific information may be used to provide additional information regarding the generic provisioned storage for other purposes. For example, the application-specific information may be used in connection with further annotating provisioned storage and presenting the information to a user. The application-specific information may be used in annotating other information maintained and used for other purposes than the second mapping stage 122 as described herein. For example, the application-specific information may include application-specific attributes associated with data objects of a data model used in presenting information on currently allocated and provisioned storage to the user. As such, the first mapping stage 120, in addition to producing the generic storage resource requirements, may produce other types of outputs used in connection with other processing operations, tasks, and data models.

The generic storage resource requirements 104 may be mapped by the second mapping or translation stage 122 into physical data storage requirements 106. The requirements 106 may vary with the particular type of data storage system (e.g., different data storage system by same or different vendor), customer's configuration and data storage environment (e.g., which data storage system types, number of each, vendor), amount and type of cache, number and type of devices on each data storage system (e.g., disks, disk or other device characteristics such as capacity, number of disks), and the like. The requirements 106 identify data storage system resources used in connection with implementing or fulfilling a request to provision storage for use by the application. Such resources may include the one or more physical devices from which storage is allocated for use in storing data and any parity information. In an embodiment in which the data storage system is a multiprocessor architecture, a designated section of cache of the data storage system may be assigned to service I/O requests for one or more portions of the allocated storage. (Note that it is possible to practice the technique by allowing all applications to share the same cache but to prioritize one application's storage over another. Thus, in an alternative preferred embodiment, instead of setting aside a portion of the cache for each application, a priority scheme is used, such that when there is little competition for resources, all applications may take advantage of the cache.) The processing of stage 122 maps the generic requirements of 104 in accordance with the different data storage specific properties that may be associated with each provision request to the physical resources of the data storage system. As an example, a provision request for an application is mapped to a section of cache in accordance with the data storage best practices codified in 122. With reference to the generic storage requirements 104 that may refer to write-weighted or read-weighted cache configuration, data storage system best practices may determine how-weighted and read-weighted cache configuration are defined for each type of data storage system.

In connection with the techniques herein, an embodiment implementing application best practices does not have to have any knowledge regarding the underlying data storage system and data storage system best practices. In other words, the application best practices and the data storage best practices may be developed independently of one another in accordance with the techniques herein. As a result, an instance of an application best practice implemented as part of 120 may be used with any one or more different implementations of data storage best practices of 122. Similarly, an instance of data storage best practices 122 may be used with any one or more different implementations of application best practices of 120 for different applications.

Thus, using the techniques herein, an embodiment may define a first cache configuration on a Symmetrix® data storage system. The embodiment may also define a second cache configuration on a CLARiiON® data storage system. A same application may host data storage using the techniques herein on both the CLARiiON® data storage system and the Symmetrix® data storage system. A first code module, such as a first script, may be used to perform the first mapping stage 120 in accordance with the application best practices. A second code module, such as a second script, may be used to perform data storage specific mapping of 122 for the Symmetrix® data storage system. A third code module, such as a third script, may be used to perform data storage specific mapping of 122 for the CLARiiON® data storage system. Both the second and third scripts may be used with the first script in an embodiment in accordance with the techniques herein.

To further illustrate with respect to FIG. 3, the application provision requirements may have an application-specific focus and provide a level of abstraction customized for an application such as, for example, a particular email application, law office application or medical office application, as well as a class of related applications, such as a multiple email applications. The application provision requirements may vary with the particular application as well as user level. The interface language may vary with the application. For example, if the application is a law office application, the interface language, menu options, and the like, may be tailored to the law profession and particular law office application. Similarly, a medical office application may utilize an interface language, menu options, and the like, familiar to the medical office and for the particular medical application. As such, the first mapping or translation step 120 may use one set of rules, mappings, script, and the like, for each application to implement the application specific best practices for the one or more provided user levels. For example, a first script for the medical office application may be used to map the user input parameters using medical office terminology to the generic storage requirements 104. A second script for the law office application may be used to map the user input parameters using law office terminology to generic storage resource requirements 104. The user connecting to the data storage system may be provided with a UI customized for the selected level and application to perform a requested data storage configuration. The requirements 102 obtained using the UI may vary with the user level.

The generic storage resource requirements 104 may not be tailored for any particular application. In other words, the generic storage resource requirements specifies a common terminology (e.g., data elements, model, properties, etc.) for expressing provision requests for multiple applications such as the medical application, law office application, email application, database application, and the like. The requirements 104 are mapped to cache configuration or other physical data storage requirements 106 using second mapping or translation processing defined by data storage system best practices codified as part of 122. The physical data storage system requirements 106 may be customized for the particular storage vendor and associated options. For example, the requirements 106 may be specified in terms of particular cache configurations, physical data storage devices and attributes, RAID levels and techniques, SCSI and iSCSI terminology, vendor-specific options, and the like. The best practices and the automation of the best practices as described in more detail in following paragraphs may be customized for a particular application and the particular data storage system and environment.

A policy may be defined in an embodiment in accordance with the best practices for applications and data storage systems. A policy may be characterized as an instantiation of the application practices and/or data storage system best practices in an embodiment. A policy including application best practices may specify defaults used in connection with the different user levels for one or more applications. For example, for an email application, the policy may specify a cache configuration strategy and a default amount of mailbox data storage capacity and log storage capacity for each mailbox or group of mailboxes, may indicate that mailbox data is stored on FAST storage and that log data is stored on CHEAP storage, and may also specify other application independent or application-neutral criteria that may be used in servicing the provisioning request. The other criteria may include whether the data storage for the application should be allowed to share a RAID group with a different application thus affecting I/O performance, whether the storage needs to be expandable for use with the application's future storage needs, an expansion factor or amount indicating a threshold minimum amount of available storage for use with future data storage needs of the application, and the like. A policy including data storage system best practices may define CHEAP and FAST for each type of data storage system. For example, an embodiment may specify a data storage system best practices policy for a first type of data storage system in which FAST is defined as using Fibre Channel drives, a RAID-10 configuration of device pairs, and assigning servicing of I/O requests by a particular data storage system service processor since the first type of data storage system is a multi-processor architecture. For a second type of data storage system, FAST may be defined as using Fibre channel drives, and a RAID-5 (4 data drives+1 parity drive) configuration. The second type of data storage system does not include multiple data storage system service processors for servicing I/O requests thus no data storage service processor assignment is made. If the second type of data storage system does not support use of Fibre channel drives but rather uses a different form of storage or other device having high speed performance characteristics, then such a device may be specified rather than the Fibre channel devices. Different elements that may be included in a policy are described herein in more detail.

The cache of the data storage system may be configured for use in connection with specifying generic requirements of 104. An embodiment may configure the cache for use in connection with servicing a provisioning request prior to the issuance of the provisioning request. In other words, the cache may be configured at a first point in time. At a second later point in time, cache may be allocated from the previously formed cache configuration in connection with a provisioning request to allocate cache for use with an application hosting data on the data storage system. As will be described in more detail herein, cache configurations may be formed at different points in time in connection with the life cycle of a data storage system and a defined policy. For example, a cache configuration may be formed as part of data storage system initialization and startup processing and when new data storage devices are added to a data storage system. An embodiment may also form cache configurations as part of processing in response to receiving a provisioning request. Examples of the foregoing and different variations of how and when cache configurations may be formed are described in more detail herein.

Figure 4:
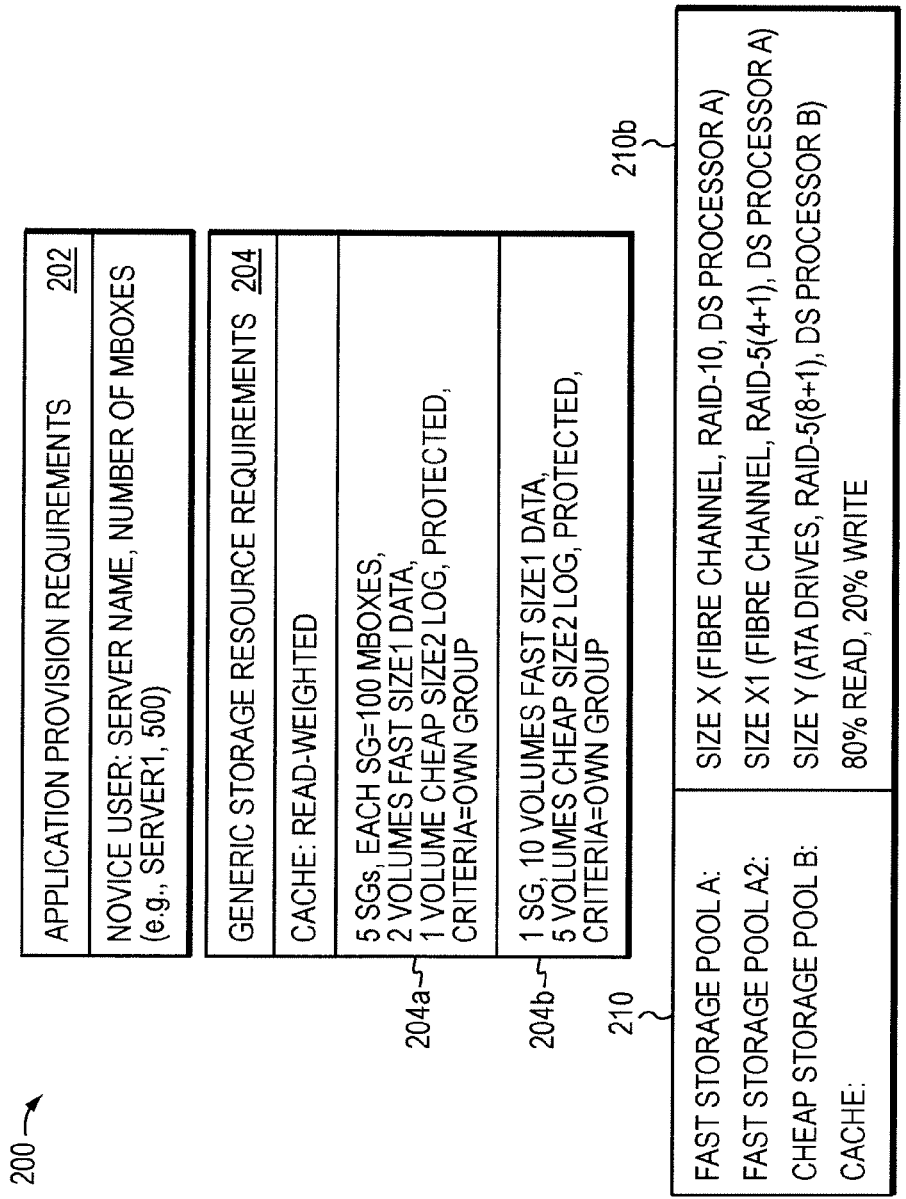
FIG. 4 is an example illustrating use of the techniques herein in connection with provisioning storage for an application in an embodiment.

Referring to FIG. 4, shown is an example illustrating use of the techniques herein with the two stage mapping processing as described in connection with FIG. 1. The example 200 includes application provision requirements 202 which are input in connection with a NOVICE user proficiency level for an email application hosting storage on the data storage system. In this example, the requirements of 202 include a server name, such as "SERVER1", and a number of mailboxes, such as 500. The user may be requesting that storage be allocated for 500 mailboxes for use with an email application. The application best practices for the email application may be codified using a script, rules, programming language, and the like, which map the requirements of 202 to the generic storage resource requirements of 204. In this example, the element 204 includes the generic storage resource requirements further annotated with application specific information as will be described in more detail below. In an embodiment, one or more candidate solutions or ways in which the resource provisioning request may be serviced may be specified in terms of the generic resource requirements. The example 200 illustrates a generic cache configuration solution and two possible or candidate storage pool solutions 204a and 204b. For each of these candidate solutions, the currently available resources of the data storage system may be examined to see if the provisioning request may be implemented in accordance with each candidate solution. In other words, each candidate solution specifies a cache configuration solution or amounts and types of data storage needed to fulfill the current provision request. The current state of available resources on the data storage system is examined to determine if it is possible to allocate resources as needed for each candidate solution. It may be that there are insufficient resources available on the data storage system so that one or more candidate solutions are eliminated. (For example, the data storage system may have little or no ability to modify its cache configuration.) In this example, candidate solution 204a indicates that 5 storage groups (SGs) may be formed in which each SG consists of storage for 100 mailboxes. Each SG may include 2 volumes of FAST storage of capacity SIZE1 for storing mail data, and 1 volume of CHEAP storage of capacity SIZE2 for logging purposes. Both of the foregoing are stored on storage which is PROTECTED or provides data protection in the event of device failure. Data protection may be a generic way of specifying some form of data redundancy such as mirroring, or other technique (e.g., RAID protection via parity information) by which data recovery is possible in the event of a data device failure. Candidate solution 204b indicates that a single SG may be formed consisting of storage for all 500 mailboxes. The SG may include 10 volumes of FAST storage of capacity SIZE1 for storing mail data, and 5 volumes of CHEAP storage of capacity SIZE2 for logging purposes. In connection with solution 204b, additional CRITERIA may be specified of OWN GROUP. In one embodiment, OWN GROUP may be used to indicate that the storage allocated for use by the email application should be from a RAID group which does not share storage with any other application. Such criteria may affect the performance of servicing I/O requests for each application hosting data included in the same RAID group. In another embodiment, OWN GROUP may indicate that the data storage in connection with this single provisioning request should be in its own RAID group so that these particular 500 mailboxes do not share a same RAID group with other mailboxes for this email application or another application.

As described above, the first mapping or translation stage 120 may output generic storage resource requirements and also application-specific information as included in 204a and 204b. With reference to the cache, the generic resource requirement is read-weighted With reference to 204a, the generic resource requirements may include the following information describing generic storage allocated for each of 5 storage groups (SGs):

2 Volumes FAST SIZE1, 1 volume CHEAP SIZE2, PROTECTED,

CRITERIA=OWN GROUP

In other words, 5 sets of the foregoing generic storage volumes are allocated, each set being associated with storage provisioned for a different SG. The SG associations may be expressed in the application-specific attributes described below.

The remaining information of element 204a may be application specific information. For example, application specific information of 204a may include information regarding the fact that 5 storage groups (SGs) are formed, each SG contains 100 Mboxes (mailboxes), and also that each SG consists of a particular number and type of generic storage volume (e.g., 2 FAST volumes and 1 CHEAP volume). In other words, the SG application-specific attribute may be associated with particular instances of provisioned generic storage. Furthermore, each generic FAST storage volume may be associated with an application specific attribute of "Data" (e.g., an application specific attribute of "Data" occurs in "2 Volumes FAST SIZE1 Data, PROTECTED"). Each generic CHEAP storage volume may be associated with an application specific attribute of "Log" (e.g., an application specific attribute of "Log" occurs in "1 volume CHEAP SIZE2 Log, PROTECTED"). The attributes of Data and Log, along with the SG attribute, may be particular to the email application and used to annotate or further describe information maintained in a data model for other uses such as presenting information on provisioned storage for different applications to a user.

With reference to 204b, the generic resource requirements may include the following information:

10 volumes FAST SIZE1, 5 volumes CHEAP SIZE2, PROTECTED

CRITERIA=OWN GROUP

The remaining information of element 204b may be application specific information. For example, application specific information of 204b may include information regarding the fact that 1 storage groups (SGs) is formed containing all 500 mailboxes and that the single SG consists of particular generic storage data elements such as 10 FAST volumes and 5 CHEAP volumes. Each FAST volume in this example may be associated with an application specific attribute of "Data" (e.g., an application specific attribute of "Data" occurs in "10 Volumes FAST SIZE1 Data, PROTECTED"). Each CHEAP volume in this example may be associated and an application specific attribute of "Log" (e.g., an application specific attribute of "Log" occurs in "5 volumes CHEAP SIZE2 Log, PROTECTED").

Element 210 may represent results including the cache configuration and the different storage pools configured from the physical devices of the data storage system. In other words, element 210 may represent the cache configuration and the different storage pools configured from the physical devices as illustrated in FIG. 3 in accordance with data storage system best practices for a currently defined policy. (Note that application aware cache best practices may have different cache configurations for different proposed solutions. For example, if a 100 SG solution delivers higher disk performance, the cache requirements might be lower than the cache requirements for the 10 SG solution. Thus, the cache configuration is not necessarily independent of the solution selected.) Element 210 includes a cache which is 80% allocated to read cache and 20% allocated to write cache. Element 210 includes FAST storage pool A of SIZE X, and FAST storage pool A2 of SIZE X1. Element 210 may also include CHEAP storage pool B of SIZE Y. For purposes of illustration, a policy may be in effect which defines FAST storage as preferably formed from Fibre channel devices with a RAID-10 configuration of pairs of physical devices for mirroring, and CHEAP storage formed from ATA (Advanced Technology Attachment) devices with RAID-5 having 8 data drives and 1 parity drive (8+1). At data storage system startup time, FAST storage pool A and CHEAP storage pool B may be configured. At a first later point in time, 5 more Fibre channel drives may be added to the data storage system for additional storage capacity and processing may be performed to configure these 5 drives into storage pools for use with the techniques herein. In accordance with data storage system best practices, although RAID 10 may be preferred over other RAID levels and configurations, the data storage system best practices may note that 5 drives have been added and thus, to make use of all 5 drives, a RAID 5 configuration of 4 data drives and 1 parity drive may be preferred in this particular instance with the addition of an odd number of 5 drives. (The addition of drives and other application storage may cause a change to the cache configuration. Best practices can be applied each time something changes in the system.) As such, the code implementing the data storage system best practices may result in formation of the FAST storage pool A2.

For each candidate solution 204a and 204b, the different storage pools, currently available data storage capacity, and associated properties of 210b are examined in accordance with the following for each candidate solution: the type of storage (e.g., FAST or CHEAP), the amount of storage of the different types required to implement the solution, and the other criteria (e.g., OWN GROUP) and other attributes specified (e.g., PROTECTED).

It should be noted that the metric indicating the level of fitness associated with each candidate solution may also be presented to the user. In one embodiment, whether the metric is presented or not may depend on the user proficiency level. For example, the metric may not be presented to NOVICE proficiency level users but may be presented along with the possible solutions to the INTERMEDIATE proficiency level user. Additionally, for NOVICE users, an embodiment may perform processing to automatically service the provisioning request with the highest ranked solution set without further interaction with the user.

As described above, it may not be possible to implement a provisioning request due to insufficient capabilities or insufficient available resources on the data storage system. In such instances, processing may be performed to indicate an error or status and recommend installation of additional storage devices in the data storage system in accordance with best practices. Some of these have been outlined above for the particular example. However, an embodiment may perform other alternatives and processing.

Figure 5:
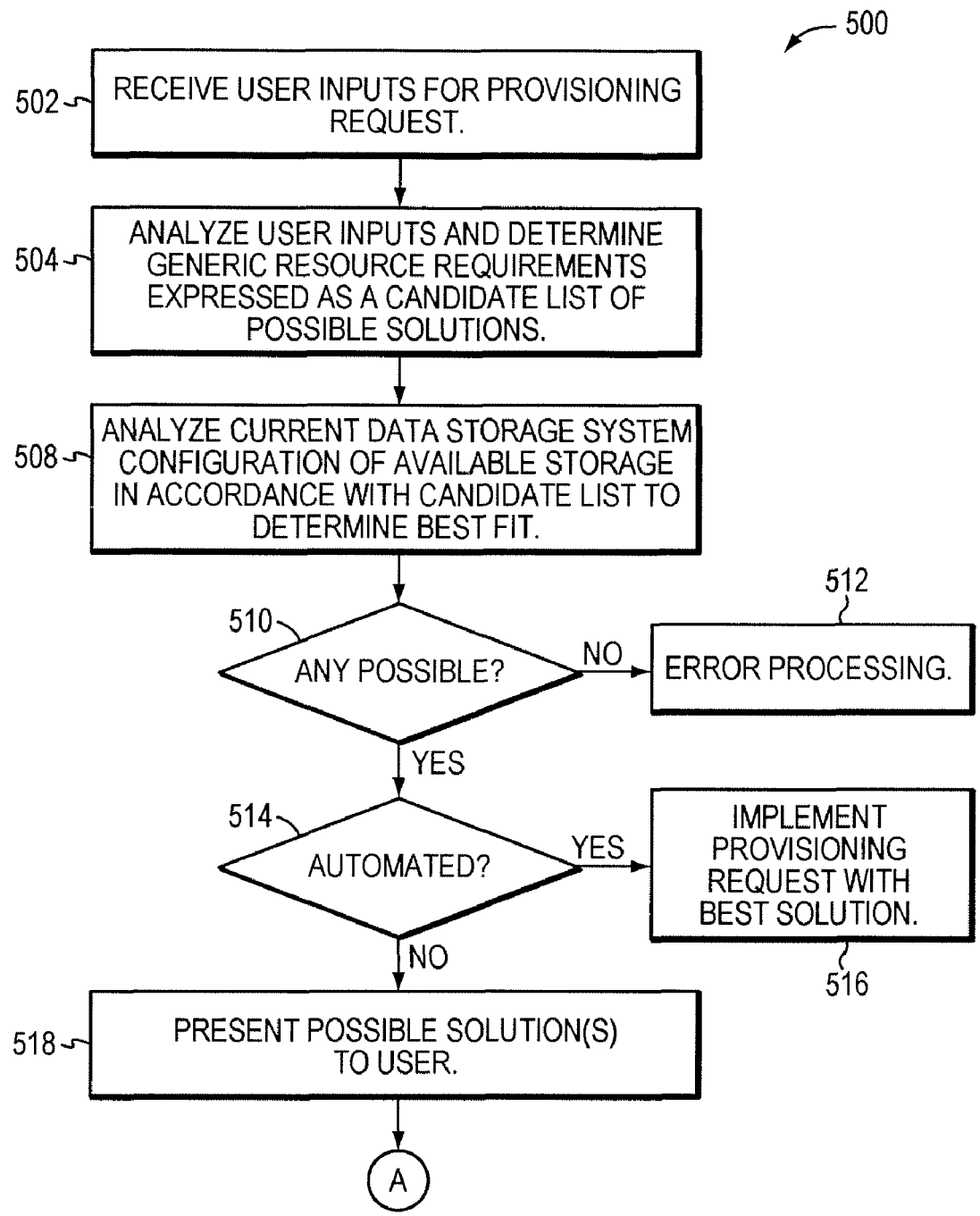
FIGS. 5-8 are flowcharts of processing steps that may be performed in connection with the techniques herein for provisioning storage in an embodiment.
Figure 6:
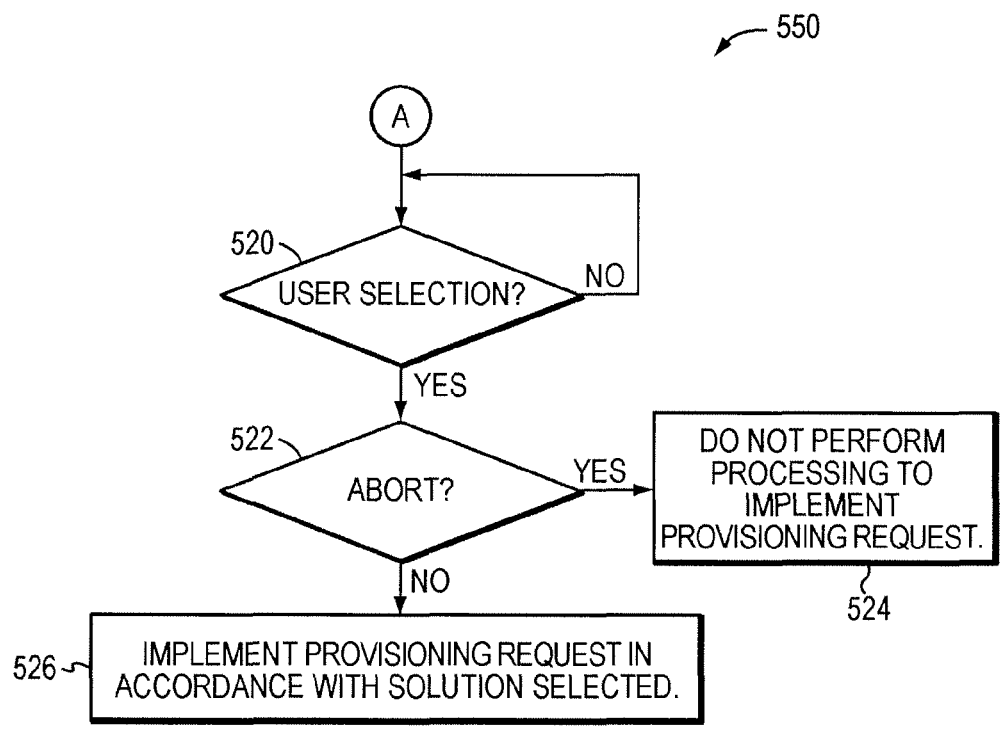

Referring to FIGS. 5 and 6, shown are flowcharts of processing steps that may be performed in an embodiment in connection with the techniques herein for processing a provisioning request for data storage. The processing steps summarize processing as described above. At step 502, the user inputs for the provisioning request are received. Step 502 includes receiving the application provision requirements 102 of FIG. 2 that may vary with application and user proficiency level. At step 504, the user inputs are analyzed in accordance with the application best practices to determine the generic resource requirements. Step 504 includes performing the first mapping or translation stage 120 of FIG. 2. At step 504, a list of one or more candidate solutions may be determined. The list of candidate solutions may include different ways in which the generic resource requirements may be expressed, for example, as illustrated by elements 204a and 204b of FIG. 4. Step 508 analyzes the current data storage system configuration of available storage in accordance with each possible solution of the candidate list to determine which of the candidate solutions can possibly be implemented in accordance with the currently available resources of the data storage system. Additionally as part of step 508, a fitness level or metric may be associated with each candidate solution so that the solutions can be ranked. Such a metric may be used in connection with selecting a best solution from multiple candidate solutions. At step 510, a determination is made as to whether implementation of any candidate solution indicated in the candidate list is possible in accordance with the currently available resources of the data storage system. If step 510 evaluates to no, control proceeds to step 512 to perform error processing. As described above, an embodiment may determine that if a candidate solution cannot be implemented in accordance with the specified storage types (e.g., FAST and CHEAP) and amounts of storage required with the particular characteristics (e.g., PROTECTED attribute and OTHER CRITERIA that may be specified), step 510 may evaluate to NO. As a variation, an embodiment may consider alternatives or acceptable variations to candidate solutions. For example, a candidate solution may specify a first amount of FAST storage and a second amount of CHEAP storage. There may be insufficient resources to obtain the first amount of FAST storage. However, if no other solutions are possible, an embodiment may consider implementing the provisioning request using all CHEAP storage. Whether such a variation is considered and acceptable may vary with an embodiment.

If step 510 evaluates to yes, control proceeds to step 514 where a determination is made as to whether automated processing is performed in connection with implementation of the provisioning request. As described herein, an embodiment may perform such automated processing in accordance with the currently specified user proficiency level, configuration settings or options, and the like. For NOVICE users, the best candidate solution may be selected and automatically implemented without further user interaction. If step 514 evaluates to yes, control proceeds to step 516 to automatically implement the provisioning request in accordance with the best candidate solution from step 508. As described herein, the best solution may be determined in accordance with a fitness level expressed as a metric. If step 514 evaluates to no, control proceeds to step 518 to present the one or more possible candidate solutions which can be implemented to the user. At step 520, processing waits for a user selection. In one embodiment, a user may be presented with the list of candidate solutions which can be implemented and also an option to abort the provisioning request so that no solution is selected. Once a user inputs a selection, control proceeds to step 522. At step 522, a determination is made as to whether there has been a selection to abort the provisioning request. If so, control proceeds to step 524 where no processing is performed to implement the request. If step 522 evaluates to no, control proceeds to step 526 to implement the provisioning request in accordance with the solution selected. Step 526 may include allocating storage from the appropriate storage pools. As will also be described in more detail in following paragraphs, step 526 may include performing other processing including configuring physical devices or RAID groups into storage pools depending on the data storage system policy and state of the data storage system.

As described above, data storage configuration processing in connection with configuring cache for use with the techniques herein may be performed at various times in the lifecycle of a data storage system. Additionally different degrees or levels of cache configuration may be performed at different times. Data storage devices may be configured for use with the techniques herein to form configurations. Thus, prior to cache being allocated for use in connection with servicing a provisioning request, at least some of the available cache may already be allocated in accordance with data storage system best practices. There are different points in time at which cache may be configured for use. As described above, cache may be allocated and configured into as part of data storage system initialization or startup. At such a time, the cache currently allocated in the data storage system may be reconfigured. As a variation, an embodiment may not allocate all cache as part of startup or initialization processing. Rather, an embodiment may configure a certain amount of cache in accordance with a defined policy so that a portion of the cache remains unallocated after data storage initialization processing is complete. As a result, at least a portion of the cache may be configured dynamically or as part of processing a received provisioning request. Such processing may be performed, for example, as part of step 526 processing of FIG. 6 and may allow for configuring the cache in accordance with the current provision request. In other words, rather than decide at data storage system initialization time how to configure all available cache, a portion of the cache may remain unallocated so that the portion of cache may be so configured in accordance with provision requests actually received. An embodiment may not know at data storage system initialization time how best to configure all the cache since it may not be known at that time how such data storage may actually be consumed by one or more applications.

It should also be noted that an embodiment may elect to partially configure a portion of cache in accordance with a data storage system policy. A data storage configuration may include forming RAID groups from physical devices, forming data LUNs from the RAID groups, forming device volumes from the LUNs, and configuring cache for use with one or more of these formations. (In at least one implementation, cache configuration is part of data storage configuration, and the service level goal that is honored for an application depends on all that is configured for its use, including the cache.) As such, cache may also be partially configured by performing configuration processing to one of the foregoing configuration processing points or levels. For example, at data storage system initialization time, a first portion of the cache may be configured. The remaining portion of cache may be left unallocated. However, additional processing to configure the remaining portion of cache may not be performed until a later point in time such as in connection with processing a provisioning request. Data storage may be first allocated from formed storage pools with the remaining portion of physical devices being configured into the appropriate storage groups as needed in accordance with subsequently received provisioning requests. For example, as storage from a first storage pool is allocated for use with provisioning requests, additional RAID groups may be added to the first storage pool. In one embodiment having a multiprocessor data storage architecture, when RAID groups are configured into data storage LUNs, an amount of cache and a data storage processor may be assigned to service I/O requests for the LUNs. An embodiment may choose to determine which portion of cache or which data storage processor services a LUN (e.g., perform the processor-LUN assignment or binding) at a later point in time after the RAID groups are configured in accordance with current load or tasks being performed by each data storage processor.

In accordance with the techniques herein, application best practices, and thus the code implementing the same, may change over time. For example, application best practices may be change for a particular application as new features are added, with a software version upgrade, as runtime behavior and application implementation associated with an existing feature changes, as best practices are improved with better ways of implementation, and the like. In connection with a modification to an application best practice, an embodiment implementing such application best practices using a policy may download a new code module, script, and the like, which implements the current application best practices. For example, an updated script or set of rules may be used to define a revised application best practices for an email application. The new script or set of rules may be downloaded to the data storage system, for example, from a vendor or VAR (value added reseller) website or other network location as well as from storage local to the data storage system, such as from a CD, USB or flash memory device, and the like.

In accordance with the techniques herein, a data storage vendor may supply an implementation of data storage system best practices in the form of a policy. Another party, such as a VAR, may supply an implementation of application best practices in the form of a policy for VAR-supplied applications. For example, the VAR may have customers which use a VAR supplied application, such as a medical office application, law office application, dental office application, and the like. The application may be customized or particular to a vertical market, profession, service, and the like. The VAR may supply a script or other code module which implements the application best practices for provisioning storage. Additionally, the VAR may also supply a policy and appropriate configuration settings which allows for automation of best practices and specification of a user proficiency level(s) for the different customers. The policy may also indicate a cache configuration strategy or an amount of cache data storage for which configuration into storage pools is performed or a degree to which data storage devices are configured. The foregoing may be used in connection with initialization processing as well as when new devices are added.

In accordance with techniques and the examples herein, a policy may implement data storage system best practices to define how to configure cache. For example, a policy may specify how to form write-weighted and read-weighted configurations described herein. Several different device and configuration characteristics may be used to configure cache. For example, one or more of the following may be used in specifying the data storage system best practices in a policy: the size of the cache, which data storage processor is used to service I/O requests (e.g., may be considered in a multiprocessor data storage system architecture; the selected process may vary with the load on a given processor and desired performance).

It should be noted that a choice of cache configuration may impact the performance of read and write operations.

At least one embodiment has the following characteristics. Cache resources are provisioned and configured at the same time as storage resources for the application are configured.

Application and device best practices are followed, and are kept separate to aid portability, as described above with respect to application best practices and storage system (device) best practices.

Cache provisioning and configuration may be static only or may be complemented by dynamic cache tuning (e.g., user driven or automatically per application specific policy). In other words, cache configuration can be either fully static or have a best practice driven starting point and be tuned after that.

Under application awareness, it is known, for each application, which storage objects in the system are used by the application. Thus, it is known which storage objects are mapped to which applications and therefore which best practices should apply to these storage objects. This information may be used for reporting to the user and to tune the system including the cache on ongoing basis. Since it is known which sets of storage objects belong together, a group can be formed in which the objects should be treated the same.

Figure 7:
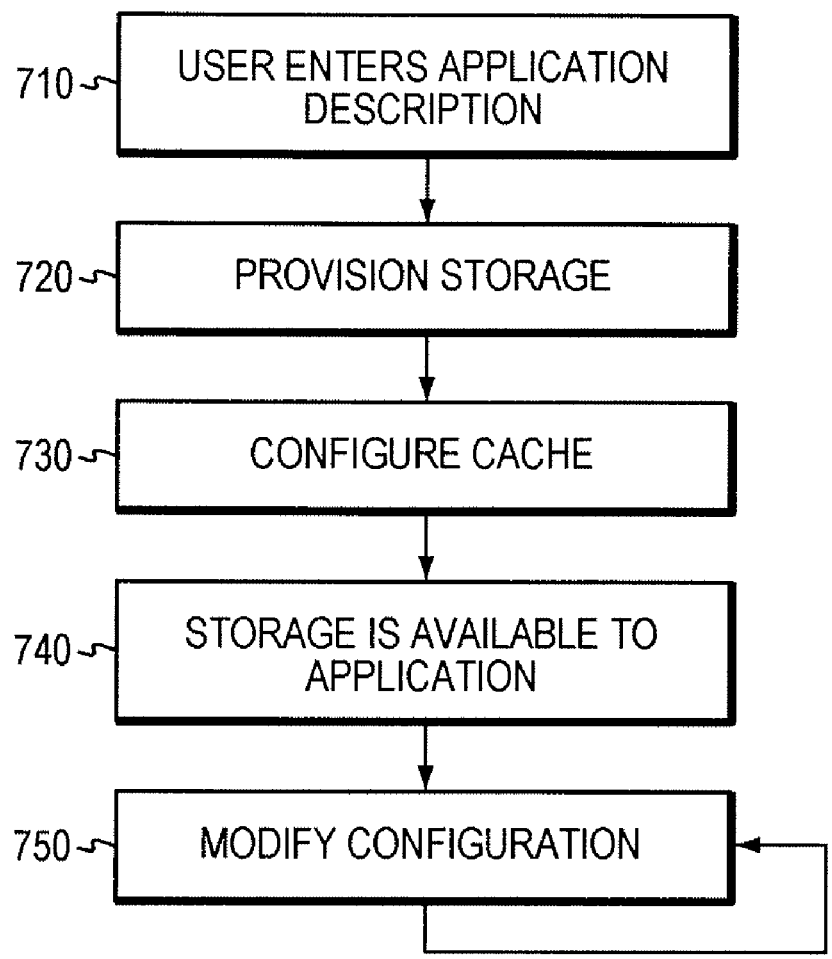

FIG. 7 illustrates an example of overall operation flow. The user enters an application description (step 710), which depending on the user's proficiency level may include only high level information such as the identity or type of application (e.g., email software and number of users, or network share and capacity). Storage is provisioned as described above (step 720). Cache is then configured (step 730), based on the application description and the corresponding storage objects as provisioned. The storage becomes available to the application (step 740). On an ongoing basis, the configuration is modified based on current conditions and parameters (step 750)

Figure 8:
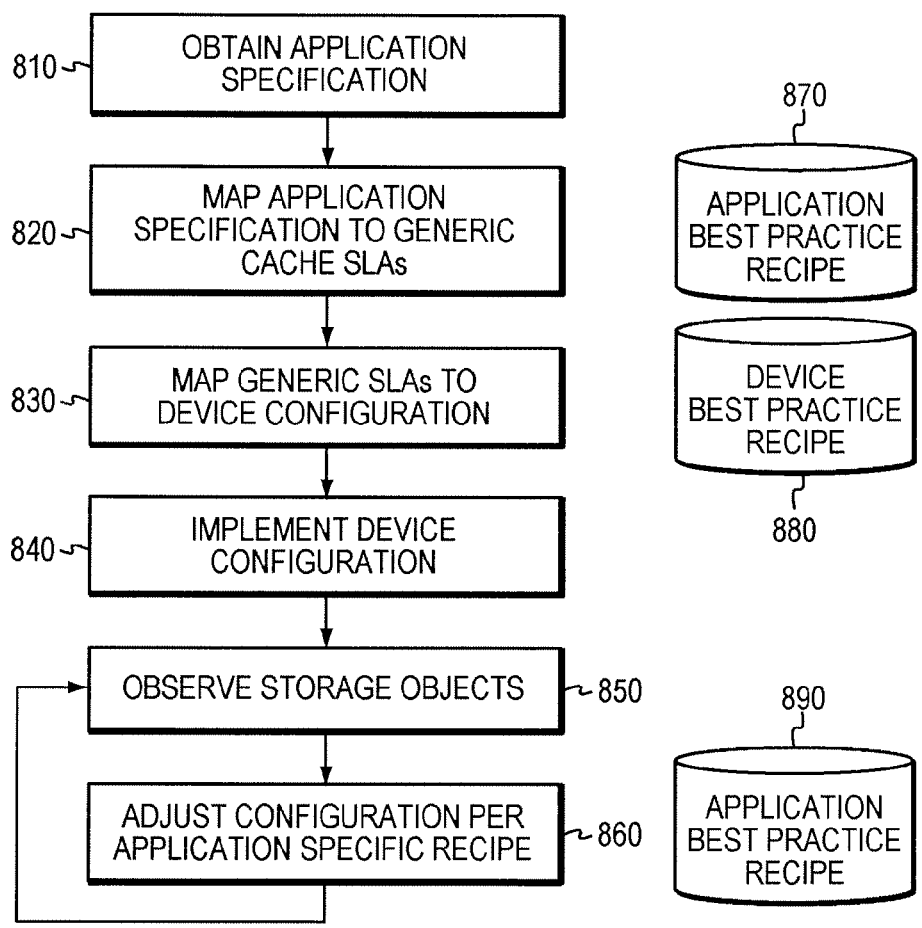

FIG. 8 illustrates a more detailed operation flow of configuring cache. An application specification as described above is obtained (step 810). The application specification is mapped to generic cache service level goals (also known as service level agreements or SLAs) (step 820), in accordance with at least one application best practice recipe 870. The generic SLAs are mapped to a specific device configuration (step 830), in accordance with at least one device best practice recipe 880. The device configuration is implemented (step 840). On an ongoing basis, storage objects are observed (step 850) and the configuration is adjusted in accordance with an application specific recipe 890.

Cache parameters configured by application and device best practices may include one or more of the following: overall cache size for the application, amount dedicated to write cache, amount dedicated to read cache, caching algorithms appropriate for the application (e.g., write through, write back, least recently used (LRU), most recently used (MRU)), page size, whether high availability (HA) is needed, whether cache needs to be crash-resistant, cache protection strategy (e.g., mirrored, flash-based, not mirrored), prioritization (which may also be time based), application aware prefetching and flushing (e.g., by file type), read ahead, file level vs. block caching (which can be even more complicated and it can be important to do tuning and configuring for the user).

Application aware tuning may be used for all storage objects for which it is known which applications make use of them. Associated parameters (such as caching for these storage objects) may be adjusted or tuned dynamically in accordance with an application policy and other parameters (e.g., time of day). In an example, a system is hosting an email application and a night-time data crunching application, all for a U.S.-only company. At 2 a.m. the amount of cache allocated for the email application is reduced, so that the data crunching application gets 90% of cache and 80% of that is allocated to read cache for large I/Os. At 6 a.m. the configuration is switched back to 80% cache for the email application and 80% of that for write cache. In at least one implementation, the email application best practice recipe is built into the data storage system or appliance, and the data crunching application best practice recipe is provided by a partner.

In at least some cases, cache configuration may be implemented as follows. GUI screens collect application information from the user and put the information into an application object. The application object is passed to a provisioning service which creates storage objects. The provisioning service passes application object and storage object information to a cache configuration service, which takes all of this information and chooses a best practice script for the application and runs the script in a script engine. The script runs and produces an object that contains generic cache configuration requirements (e.g., generic cache SLAs). The cache configuration service takes the generic cache configuration requirements object and loads and runs this script in the script engine, which directly configures the cache.

In at least some cases, cache auto tuning may be implemented as follows. A cache policy manager starts up, loads application policies for tuning, and maps storage objects to application policies. The cache policy manager runs continuously and checks whether triggers are met (e.g., with respect to time or performance) for specific storage objects. Each trigger is implemented as a script. If trigger conditions are met, the policy script executes the tuning code corresponding to this trigger.

By way of example, an application specification may include the following.

ApplicationType="Microsoft Exchange 2007"
ApplicationName="Bob's Exchange"
NumberMailBoxes=500
BusyTime=7 am to 9 pm By way of example, generic cache requirements corresponding to this application specification may include the following.

PageSize=64 k
WriteCache=90%
ReadCache=10%
CacheProtection=High
PeakTimeStart=7 am
PeakTimeEnd=9 pm Pseudocode below describes an example script according to which cache configuration settings are performed for each LUN in a set of LUNs used for a Microsoft Exchange application.

spA→setWriteCacheSize(9000 MB)
spA→setReadCacheSize(1000 MB)
spB→setWriteCacheSize(9000 MB)
spB→setReadCacheSize(1000 MB)
for (lun in ExchangeLUNSet)
{
    lun→setWriteCache(on, pagesize=64 kb, mirroredCache)
}

In general, since the system is aware of which storage objects (including LUNs, RAID groups, and storage groups) are being used by an application, the system can set and tune cache for all of the storage objects in accordance with application and device best practices. An email application's database may use 100 LUNS which are on 3 RAID groups, and the email application's logs may use 10 LUNs, and cache settings for each of the LUNs in each set may be set consistently.

In at least one case, an appliance product may have the ability to run a NAS-oriented operating system simultaneously with running a SAN-oriented operating system, and application and device best practices information may be used for both.

In the case of an email application, best practices may include setting one or more IOPS based triggers for allocating, deallocating, or otherwise configuring cache. For example, if it is detected that the email application is experiencing more than 300 IOPS, more of the cache may be allocated for the email application. In another example, the amount of cache allocated to an application may depend on whether the application's activity is considered hot (e.g., at least 3000 IOPS), lukewarm (e.g., 300 IOPS), or cold (e.g., less than 100 IOPS).

Using the techniques herein, the best practices for applications and data storage systems may be codified in any one of a variety of different forms and may be supplied independently of the underlying software installed on the data storage system. A vendor, VAR or other third party may customize scripts or other forms used to implement the application and/or data storage system best practices. The forgoing scripts or other implementation of the best practices may be provided to a customer in a variety of different ways as described herein. A VAR or other party may also customize a codified version of the application or data storage system best practices as well as set other configuration options and defaults for use with the techniques herein by a particular customer. The foregoing may be customized for use by a customer having a particular proficiency level, such as NOVICE, in which the techniques herein may be performed in an automated fashion.

Described herein are techniques for performing resource provisioning based on application best practices automated at varying degrees in accordance with a user proficiency level. The techniques herein may be used to automatically configure cache for use in connection with allocating storage for an application. Cache configurations may be created, modified and managed in an automated fashion based on best practices for the particular data storage system. Cache configuration and provisioning may be performed in a separate stage from the provisioning of resources in connection with an application provisioning request which uses the application best practices. Cache configuration and provisioning may also take into account application best practices, for example, by determining how much of particular cache configuration types (e.g., write-weighted and read-weighted) to configure based on what application may use the cache. Cache may be configured at various points in time during the life cycle of the data storage system and to varying degrees. Cache may be configured, completely or partially, at data storage system initialization, when new storage devices are added, and/or as part of processing in connection with a provisioning request. As described herein, a policy may be a formal description or implementation of best practices. The policy may be applicable for use with different application input requirements that may vary with user level of proficiency. New or updated policies may be provided for use on the data storage system independent of other data storage system software upgrades. Different aspects of the techniques herein, such as user dialogues and varying the degree to which storage provisioning and configuration may be automated, may be in accordance with user proficiency levels.

As will be appreciated by those skilled in the art, the examples described herein may be simplistic for purposes of illustration of the techniques herein. An embodiment may have a greater amount of detail and complexity in order to provide automation of the best practices.

The foregoing provides a flexible approach for automated implementation of best practices that can be customized in accordance with the particular application, data service, and/or data storage system. The best practices may vary with application as well as the particular data storage system. The foregoing describes techniques that may be used to map provision requirements from an application domain to requirements in the storage domain in connection with a two stage mapping or translation process. The input provision requirements in the application domain may be applied and vary with different user proficiency levels. A user may select a level of interaction with the system in which the level selected varies the assumed knowledge or user sophistication, level of detail, and level of automation for the particular application. The user may select a level, such as NOVICE level, to obtain a greater level of automation of best practices customized for the particular application. A user may also select to obtain a lesser level of automation of best practices as the user knowledge level and sophistication increases. The proficiency levels may relate to the different knowledge levels associated with performing data storage management tasks such as provisioning and data storage configuration. The selected level may be associated with a particular user interface, level of automation and interaction with the data storage system for performing data services for a particular application. The automation of the best practices may be implemented using a variety of different frameworks and infrastructures. The ones mentioned herein, such as use of scripts or a rule-based system, are exemplary and it will be appreciated by those skilled in the art that others are possible to implement the techniques set forth herein.

The data storage system may automatically detect that new or updated policies are available. For example, the data storage system may be able to communicate with a network location such as an external website of a vendor and/or VAR website. The data storage system may detect new or updated policies using any one of a variety of different techniques including polling the one or more websites for changes or by having the one or more websites send a notification to the data storage system when new or updated policies are available. When a user logs into the data storage system, the UI may then display an indicator regarding the availability of the new or updated policies. The user may then initiate processing to obtain the new or updated policy in which the data storage system communicates with the external website or other network location. Depending on data storage configuration options, settings, and the like, the foregoing process may be performed automatically without any user interactions as updated or new policies are published. The new or updated policies may also be uploaded from a local storage device on the data storage system. For example, a user may insert a CD, USB device, and the like, containing the updated or new policies. The data storage system may then upload the foregoing policies for use by the data storage system.

In connection with the techniques herein regarding best practices for applications, exemplary applications such as a database application or an email application are illustrated herein although the techniques herein regarding application best practices may be applied with any application. Other applications may include, for example, a web server such as the Apache Web Server (also referred to as the Apache HTTP Server), different business applications such as a spreadsheet, presentation software (e.g., Microsoft® Office PowerPoint®), and word processing software, and different types of virtualization software, such as the VMware ESX Server provided by VMware, Inc. Virtualization software may allow a computer to run multiple operating systems on a single computer system.

An embodiment may implement the techniques herein using code executed by a computer processor. For example, an embodiment may implement the techniques herein using the rules, rules engines, and the like, using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in application aware cache management, the method comprising:
   receiving a cache management policy including one or more sets of device generic application best practices and one or more sets of device specific best practices;
   performing initial cache configuration processing in connection with configuring a cache of a data storage system, wherein said cache management policy is used in performing said initial cache configuration processing;
   identifying storage objects as being in use by an application; and
   performing application aware ongoing cache configuration processing in connection with configuring the cache of the data storage system for use with the storage objects, wherein the storage objects are used in connection with a request to provision storage of the data storage system for use by an application, wherein the request to provision storage for the application is mapped to a portion of the cache based on one or more application best practices.

2. The method of claim 1, wherein the initial cache configuration processing is performed automatically without user interaction.

3. The method of claim 1, wherein said performing initial cache configuration processing further comprises:
   performing an interactive dialogue in accordance with a user proficiency level;
   obtaining one or more dialogue responses; and
   configuring the cache of the data storage system in accordance with said dialogue responses.

4. The method of claim 3, wherein said interactive dialogue includes obtaining information identifying one or more applications expected to use the cache of the data storage system.

5. The method of claim 4, wherein the cache of the data storage system is configured using said information obtained with said interactive dialogue.

6. The method of claim 1, wherein said initial cache configuration processing includes conforming to a policy indicating how to configure the cache of the data storage system.

7. The method of claim 1, wherein said application aware ongoing cache configuration processing is in response to one or more provisioning requests subsequently received by the data storage system.

8. The method of claim 1, further comprising:
   detecting, by the data storage system, availability of a new policy at one of an external network location or a local device of the data storage system, the new policy affecting cache configuration of the data storage system; and
   copying the new policy to the data storage system.

9. The method of claim 1, wherein cache configuration processing is based on application best practices and device best practices.

10. The method of claim 1, wherein cache configuration processing is based on dynamic cache tuning.

11. The method of claim 1, wherein cache configuration processing is based on knowledge, for each application, of which storage objects in the system are used by the application.

12. The method of claim 1, wherein cache configuration processing is based on knowledge of which storage objects are mapped to which applications and which best practices should apply to these storage objects.

13. The method of claim 1, further comprising:
   provisioning storage before performing the initial cache configuration processing.

14. The method of claim 1, further comprising:
   after storage is provisioned, modifying the cache configuration based on current conditions and parameters.

15. The method of claim 1, further comprising:
   basing cache configuration on at least one of the following cache parameters: overall cache size for an application, amount dedicated to write cache, amount dedicated to read cache, a caching algorithm appropriate for the application, page size, a need for high availability, a cache protection strategy, application aware prefetching and flushing, read ahead, file level caching, block caching.

16. The method of claim 1, further comprising:
   basing application aware ongoing cache configuration processing on a policy taking into account time of day.

17. A system for use in application aware cache management, the system comprising:
   policy receiving logic receiving a cache management policy including one or more sets of device generic application best practices and one or more sets of device specific best practices;
   cache configuration processing logic performing initial cache configuration processing in connection with configuring a cache of a data storage system, wherein said cache management policy is used in performing said initial cache configuration processing; and
   object identification logic identifying storage objects as being in use by an application; wherein the cache configuration processing logic performs application aware ongoing cache configuration processing in connection with configuring the cache of the data storage system for use with the storage objects, wherein the storage objects are used in connection with a request to provision storage of the data storage system for use by an application, wherein the request to provision storage for the application is mapped to a portion of the cache based on one or more application best practices.

18. The system of claim 17, wherein the initial cache configuration processing is performed automatically without user interaction.

19. The system of claim 17, wherein said performing initial cache configuration processing further comprises performing an interactive dialogue in accordance with a user proficiency level, obtaining one or more dialogue responses, and configuring the cache of the data storage system in accordance with said dialogue responses.

20. The system of claim 17, wherein said interactive dialogue includes obtaining information identifying one or more applications expected to use the cache of the data storage system.

* * * * *